United States Patent [19]

Nishimura et al.

[11] Patent Number: 4,570,768

[45] Date of Patent: Feb. 18, 1986

[54] ELECTROMAGNETICALLY CONTROLLED SPRING CLUTCH MECHANISM

[75] Inventors: Kouzou Nishimura, Akashi; Kazumi Iida, Matsubara, both of Japan

[73] Assignee: Mita Industrial Co., Ltd., Japan

[21] Appl. No.: 653,183

[22] Filed: Sep. 21, 1984

[51] Int. Cl.[4] .................... F16D 13/08; F16D 27/10
[52] U.S. Cl. .................................. 192/35; 192/48.2; 192/51; 192/81 C; 192/84 T
[58] Field of Search ............... 192/35, 48.2, 51, 84 T, 192/40, 81 C

[56] References Cited

U.S. PATENT DOCUMENTS

| | | | |
|---|---|---|---|
| 2,727,402 | 12/1955 | Thoresen | 192/51 X |
| 3,934,690 | 1/1976 | Janning | 192/84 T |
| 4,030,584 | 6/1977 | Lowery et al. | 192/84 T |
| 4,321,992 | 3/1982 | Gallo | 192/81 C |
| 4,458,796 | 7/1984 | Nitanda et al. | 192/51 |

Primary Examiner—William F. Pate, III
Assistant Examiner—Richard M. Lorence
Attorney, Agent, or Firm—Beveridge, De Grandi & Weilacher

[57] ABSTRACT

An electromagnetically controlled spring clutch mechanism for selectively connecting drivingly a first rotating element and a second rotating element. The spring clutch mechanism comprises a rotating shaft, a rotor adapted to be rotated as a unit with the rotating shaft, an armature assembly including an armature member, a supporting member and a biasing spring member disposed between the armature member and the supporting member, an electromagnetic device for magnetically attracting the armature member to the rotor, a first boss member adapted to rotate as a unit with the rotating shaft, a second boss member adapted to rotate as a unit with the second rotating element, and a coil spring wound in a predetermined direction and received about, and spanning, the first and second boss members. Also provided is a composite magnetically controlled spring clutch assembly for selectively connecting drivingly an input rotating element rotated in a predetermined direction to an output rotating element to rotate the output rotating element selectively in the predetermined direction or in a direction opposite to the predetermined direction, which is composed of two electromagnetically controlled spring clutch mechanisms of the first-mentioned type.

8 Claims, 5 Drawing Figures

ELECTROMAGNETICALLY CONTROLLED SPRING CLUTCH MECHANISM

BACKGROUND OF THE INVENTION

1. Field of the Invention

This invention relates to an electromagnetically controlled spring clutch mechanism.

2. Description of the Prior Art

Electromagnetically controlled spring clutch mechanisms based on the utilization of coil springs have previously been used to transmit selectively the driving force of an input rotating element being rotated to an output rotating element.

The conventional electromagnetically controlled spring clutch mechanisms, however, have the disadvantage that as will be described hereinafter, during the deenergization of the solenoid, the returning of the armature from its operating condition to its nonoperating condition is retarded and its response is reduced.

SUMMARY OF THE INVENTION

It is a primary object of this invention therefore to provide an improved electromagnetically controlled spring clutch mechanism having excellent response.

A secondary object of the invention is to provide a novel composite electromagnetically controlled spring clutch assembly capable of rotating an output rotating element selectively in a predetermined direction or in a direction opposite to the predetermined direction by using the aforesaid improved electromagnetically controlled spring clutch mechanism.

Other objects of this invention will become apparent from the detailed description given herein below.

According to this invention, the primary object is achieved by an electromagnetically controlled spring clutch mechanism for selectively connecting drivingly a first rotating element and a second rotating element one of which constitutes an input rotating element to be rotated in a predetermined direction and the other of which constitutes an output rotating element, said mechanism comprising a rotating shaft to which the first rotating element is fixed and on which the second rotating element is mounted rotatably, a rotor adapted to be rotated as a unit with the rotating shaft, an armature assembly disposed on one side of the rotor and including an armature member positioned opposite to one surface of the rotor, a supporting member mounted rotatably on the rotating shaft and a biasing spring member disposed between the supporting member and the armature member for elastically biasing the armature member in a direction away from said one surface of the rotor, an electromagnetic means adapted, when energized, to attract magnetically the armature member to said one surface of the rotor against the elastic biasing action of the biasing spring member, a first boss member adapted to rotate as a unit with the rotating shaft, a second boss member disposed adjacent to the first boss member and adapted to rotate as a unit with the second rotating element, and a coil spring means received about, and spanning, the first and second boss members and connected to the armature assembly at one end and to the second rotating element at the other end, said coil spring means being wound from said one end to said other end in a direction in which the coil spring means contracts when the armature assembly and the second rotating element are rotated relative to each other incident to the rotation of said input rotating element in said predetermined direction.

According to this invention, the secondary object is achieved by a composite electromagnetically controlled spring clutch assembly for selectively connecting drivingly an input rotating element adapted to be rotated in a predetermined direction to an output rotating element to rotate the output rotating element selectively in said predetermined direction or in a direction opposite to the predetermined direction, said clutch assembly being composed of a first electromagnetically controlled spring clutch mechanism and a second electromagnetically controlled clutch mechanism, said first electromagnetically controlled clutch mechanism comprising (a) a rotating shaft having said input rotating element fixed thereto, (b) a first power transmission element fixed to the rotating shaft, (c) a second power transmission element rotatably mounted on the rotating shaft, (d) a rotor adapted to rotate as a unit with the rotating shaft, (e) an armature assembly disposed on one side of the rotor and including an armature member positioned opposite to one surface of the rotor, a supporting member mounted rotatably on the rotating shaft, and a biasing spring member disposed between the supporting member and the armature member for elastically biasing the armature member in a direction away from said one surface of the rotor, (f) an electromagnetic means adapted, when energized, to attact magnetically the armature member to said one surface of the rotor against the elastic biasing action of the biasing spring member, (g) a first boss member adapted to rotate as a unit with the rotating shaft, (h) a second boss member disposed adjacent to the first boss member and adapted to rotate as a unit with the second power transmission member, and (i) a coil spring means received about, and spanning, the first and second boss members and connected to the armature assembly at one end and to the second power transmission element at the other end, said spring means being wound from said one end to said other end in a direction in which the coil spring means contracts when the armature assembly and the second power transmission element are rotated relative to each other incident to the rotation of the input rotating element in said predetermined direction, and the second electromagnetically controlled spring clutch mechanism comprising (a) a rotating shaft having the output rotating element fixed thereto, (b) a first power transmission element fixed to the rotating shaft, (c) a second power transmission element mounted rotatably on the rotating shaft, (d) a rotor adapted to rotate as a unit with the rotating shaft, (e) an armature assembly disposed on one side of the rotor and including an armature member positioned opposite to one surface of the rotor, a supporting member mounted rotatably on the rotating shaft and a biasing spring member disposed between the supporting member and the armature member for elastically biasing the armature member in a direction away from said one surface of the rotor, (f) an electromagnetic means adapted, when energized, to attract magnetically the armature member to said one surface of the rotor against the elastic biasing action of the biasing spring member, (g) a first boss member adapted to rotate as a unit with the rotating shaft, (h) a second boss member disposed adjacent to the first boss member and adapted to rotate as a unit with the second power transmission element and (i) a coil spring means received about, and spanning, the first and second boss members and connected to the armature assembly at one end and to the second power transmission element at the other end, said spring means being wound in a direction in which the coil spring means contracts when the armature assembly and the second power transmission element are rotated relative to each other by the rotation of the second power transmission element which is incident to the rotation of the input rotating element in said predetermined direction, a set of the first power transmission element of the first electromagnetically controlled spring clutch mechanism and the second power transmission element of the second electromagnetically controlled spring clutch mechanism and a set of the second power transmission element of the first electromagnetically controlled spring clutch mechanism and the first power transmission element of the second electromagnetically controlled spring clutch mechanism being drivingly connected so that the power transmission elements in one of said sets rotate in the same direction and the power transmission elements in the other set rotate in opposite directions to each other.

DETAILED DESCRIPTION OF PREFERRED EMBODIMENTS

Figure 1:
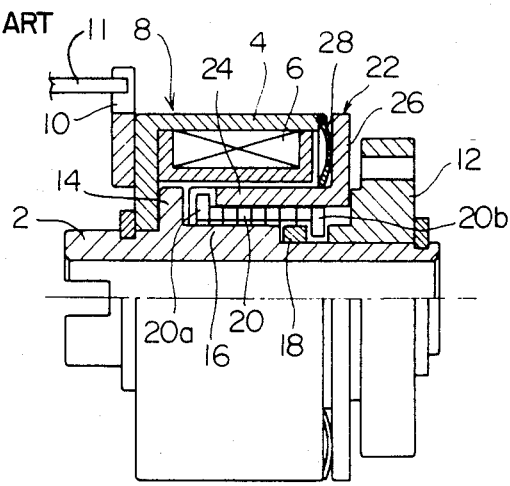
FIG. 1 is a sectional view showing a conventional electromagnetically controlled spring clutch mechanism.

To begin with, a conventional electromagnetically controlled spring clutch mechanism will be briefly described with reference to FIG. 1. The spring clutch mechanism has a rotating shaft 2 to which an input rotating element (not shown) is connected. A solenoid 8 including a field core 4 and an electromagnetic coil 6 is rotatably mounted on the rotating shaft 2. The rotation of the solenoid 8 is hampered when a supporting pin 11 is fixed to a supporting base plate (not shown) through a cut 10 formed in a part of the solenoid 8. Accordingly, in the illustrated spring clutch mechanism, the rotating shaft 2 is rotated with respect to the solenoid 8. An output rotating element 12 is further mounted rotatably on the rotating shaft 2. In the output rotating element 12 is formed a boss portion 18 extending toward a boss portion 16 extending from a rotor portion 14 formed in the rotating shaft 2. A coil spring 20 is disposed so as to surround and span the boss portion 16 formed in the rotating shaft 2 and the boss portion 18 formed in the output rotating element 12 with some space between it and the boss portions 16 and 18 as shown in FIG. 1. A boss portion 24 of an armature 22 is placed over the coil spring 20. The coil spring 20 is wound in a direction in which it contracts when the armature 22 is rotated in the rotating direction of the rotating shaft 2. One end 20a of the coil spring is connected to the boss portion 24 of the armature 22 by being inserted into a cut formed at one end of the boss portion 24. The other end 20b of the coil spring 20 is connected to the boss portion 18 of the output rotating element 12 by being inserted into a hole formed in the boss portion 18. A disc portion 26 of the armature 22 is disposed opposite to one end of the solenoid 8, and an annular plate spring 28 for biasing the armature 22 to the right in FIG. 1 is located between the disc portion 26 and the solenoid 8.

When an electric current is supplied to the electromagnetic coil 6 (and therefore, the solenoid 8 is energized) in the aforesaid electromagnetically controlled spring clutch mechanism, the armature 22 is moved to the left in FIG. 1 against the elastic biasing action of the plate spring 28, and one end surface of the boss portion 24 of the armature 22 makes press contact with one side surface of the rotor portion 14 of the rotating shaft 2 (therefore, the armature 22 sets in operation). As a result, the armature 22 rotates as a unit with the rotating shaft 2. The coil spring 20 is contracted by the rotation of the armature 22, and the boss portion 16 of the rotating shaft 2 is connected to the boss portion 18 of the output rotating element 12 through the coil spring 20. The driving force is transmitted and the output rotating element 12 is rotated as a unit with the rotating shaft 2.

On the other hand, when the supply of the current to the electromagnetic coil 6 is stopped (therefore, the solenoid 8 is deenergized), the armature 22 is moved to the right in FIG. 1 by the elastic biasing action of the plate spring 28, and the attracted condition of one end surface of the boss portion 24 of the armature 22 and one side surface of the rotor portion 14 is cancelled (therefore, the armature 22 sets out of operation). As a result, the armature 22 is not rotated but the rotating shaft 2 is rotated with respect to the output rotating element 12, and thus the driving force is not transmitted.

The conventional electromagnetically controlled spring clutch mechanism, however, suffers from a reduction in response owing to the various phenomena described below.

(1) When the solenoid 8 is deenergized to set the armature 22 out of operation, the armature 22 should rotate to some extent in a direction opposite to the rotating direction of the rotating shaft 2 by the elastic force accumulated in the coil spring 20 to thereby expand the coil spring 20. Since, however, one end of the solenoid 8 is connected to the disc portion 26 of the armature 22 through the annular plate spring 28, the aforesaid rotation of the armature 22 in the opposite direction undergoes resistance, and consequently the returning of the armature 22 to its non-operating condition is retarded.

(2) When the armature 22 is in an operating condition, some space is formed between the outer circumference of the coil spring 20 and the inner circumference of the boss portion 24 of the armature 22 owing to the contraction of the coil spring 20. Accordingly, when the solenoid 8 is deenergized to render the armature 22 inoperative, the armature 22 does not smoothly move in the axial direction until the coil spring 20 is expanded. Consequently, the returning of the armature 22 to its non-operating condition is retarded.

(3) It is difficult to impart a substantially uniform elastic biasing force to the entire circumference of the disc portion 26 of the armature 22 by the plate spring 28 disposed between the solenoid 8 and the armature 22. Thus, when the solenoid 8 is deenergized to render the armature 22 inoperative, the armature 22 does not move smoothly owing to this non-uniform elastic biasing force, and consequently, the returning of the armature 22 to its non-operating condition is retarded.

The present invention, therefore, contemplates the provision of an improved electromagnetically controlled spring clutch mechanism which eliminates the aforesaid defect of the conventional electromagnetically controlled spring clutch mechanism and can overcome the reduction in response attributed to the delay in the returning of the armature to its non-operating condition.

The electromagnetically controlled spring clutch mechanism constructed in accordance with this invention will be described in detail with reference to FIGS. 2 and 3.

Figure 2:
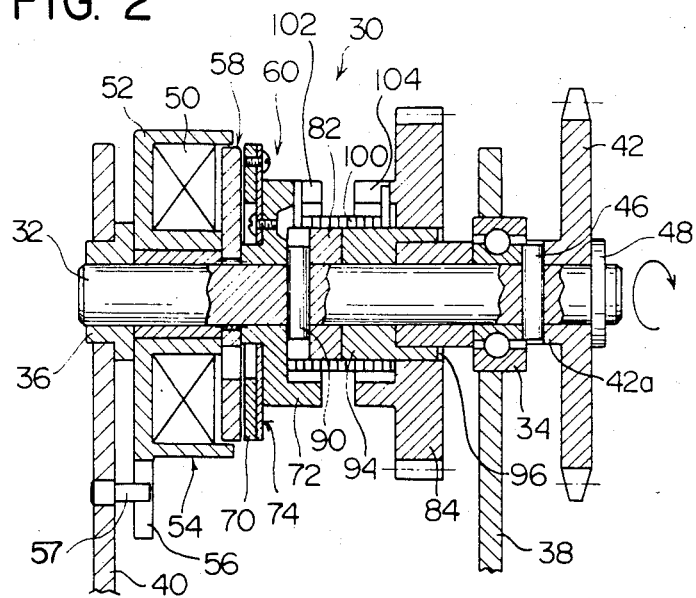
FIG. 2 is a sectional view showing the electromagnetically controlled spring clutch mechanism constructed in accordance with this invention.
Figure 3:
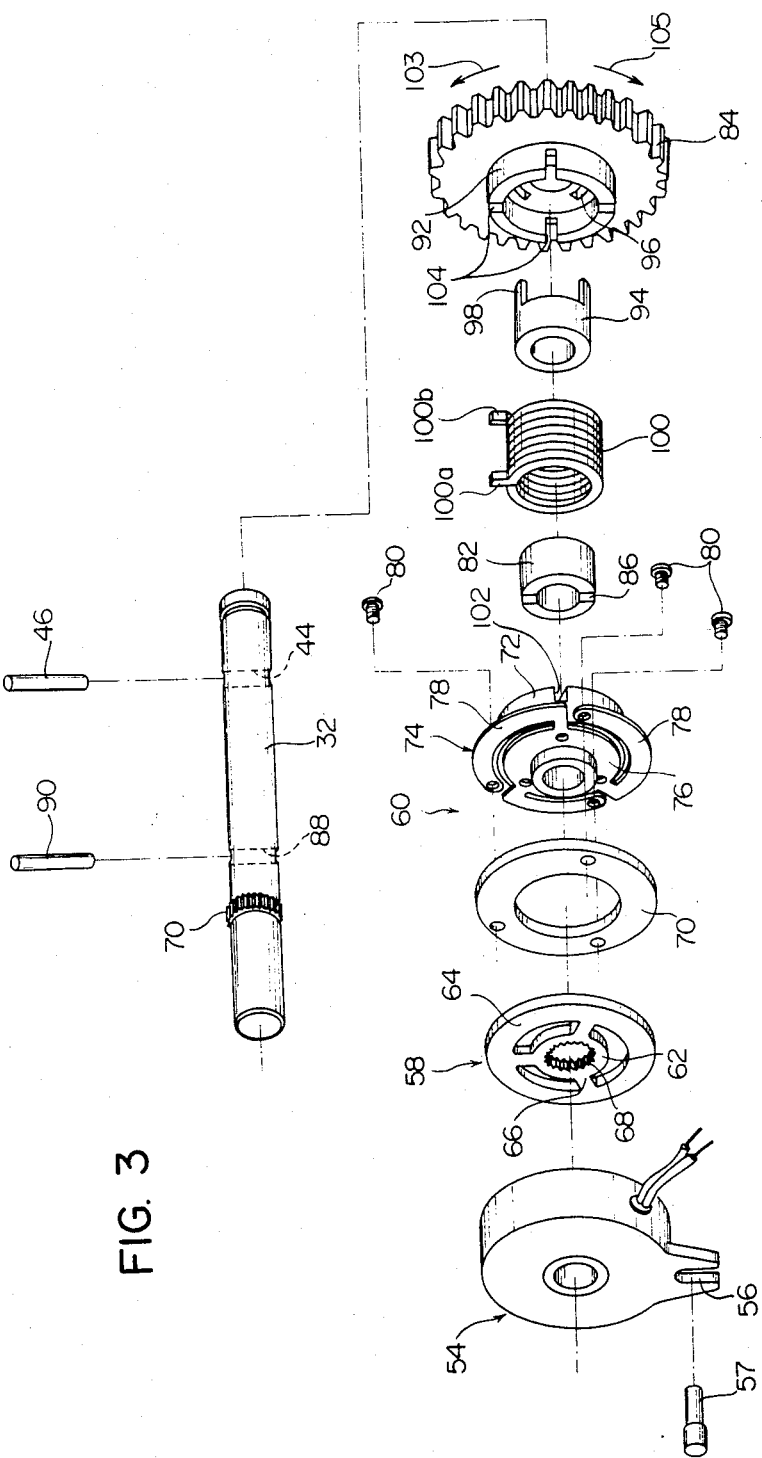
FIG. 3 is an exploded perspective view showing the electromagnetically controlled spring clutch means of FIG. 2.

In FIG. 2 showing a sectional view of the spring clutch mechanism constructed in accordance with this invention and FIG. 3 showing its exploded perspective view, the spring clutch mechanism shown generally at 30 includes a rotating shaft 32. As shown in FIG. 2, the rotating shaft 32 is rotatably mounted via bearing members 34 and 36 on supporting plates 38 and 40 spaced from each other a predetermined distance. With reference to FIG. 2, a sprocket 42 (constituting a first rotating element) which constitutes an input rotating element in the following description is mounted on one end portion of the rotating shaft 32. The sprocket 42 is mounted for rotation as a unit with the rotating shaft 32 by forcing a pin 46 into a through-hole 44 formed in the rotating shaft 32 through a cut formed in the boss portion 42a of the sprocket 42. The sprocket 42 is drivingly connected to a driving source such as an electric motor through a suitable transmission means (not shown), and is rotated in a predetermined direction shown by an arrow (FIG. 2) by the driving source. Exteriorly of (in FIG. 2, on the right side of) that part of the rotating shaft 32 on which the sprocket 42 is mounted, a stop ring 48 is mounted so as to prevent the sprocket 42 from coming out of the rotating shaft 32.

On the other end portion of the rotating shaft 32, a solenoid 54 (constituting an electromagnetic means) having an electromagnetic coil 50 and a field core 52 is rotatably mounted. A cut 56 is formed in a part of the solenoid 54, and a pin 57 implanted in the supporting plate 40 is inserted in the cut 56. Hence, when the spring clutch mechanism 30 is mounted across the supporting plates 38 and 40, the rotation of the solenoid 54 is hampered by the pin 57 and the rotating shaft 32 is rotated relative to the solenoid 54.

With reference to FIGS. 2 and 3, a rotor 58 and an armature assembly 60 are mounted on the rotating shaft 32 at positions inwardly of (in FIGS. 2 and 3, on the right of) that part of the rotating shaft 32 on which the solenoid 54 is mounted. As is clearly seen from FIG. 3, the rotor 58 is composed of an annular plate having a central base portion 62, an annular portion 64 located outwardly of the central base portion 62 and a connecting portion 66 connecting the central base portion 62 to the annular portion 64. A serrated portion 68 is formed in the central base portion 62 of the rotor 58. By the fitting of the serrated portion 68 with a serrated portion 70 formed in the rotating shaft 32, the rotor 58 rotates as a unit with the rotating shaft 32. If desired, the rotor 58 may be fixed to the rotating shaft by forcing it into the shaft 32, or formed as an integral unit with the rotating shaft 32. As is clear from FIG. 3, the armature assembly 60 includes an armature 70, a supporting member 72, and a biasing spring member 74 disposed between the armature 70 and the supporting member 72. The supporting member 72 is constructed of a cylindrical member to be mounted on the rotating shaft 32, and the annular central portion 76 of the biasing spring member 74 is fixed by a screw to one end surface of this cylindrical member. Preferably, the supporting member 72 is made of a light-weight plastic material. The biasing spring member 74 further has formed therein a plurality of (three in the illustrated embodiment) protruding portions 78 extending in the shape of a sickle blade outwardly from the annular central portion 76. The armature 70 is fixed by a screw 80 to the outside surface of the free end portion of the protruding portions 78 (the left surface in FIGS. 2 and 3). The armature 70 is formed of a circular plate having nearly the same outside diameter as the outside diameter of the annular portion 64 of the rotor 58. The armature assembly 60 is rotatably mounted on the rotating shaft 32 at a position inwardly of the mounting site of the rotor 58 on the rotating shaft 32, namely on the opposite side to that side where the solenoid 54 is disposed with respect to the rotor 58. The armature 70 is disposed opposite to the rotor 58. Accordingly, when the solenoid 54 is energized, the armature 70 is magnetically attracted to one surface of the rotor 58 against the elastic biasing action of the biasing spring member 74 and thus connected to the rotor 58. When the solenoid 54 is deenergized, the aforesaid connection of the armature 70 and the rotor 58 is cancelled by the elastic biasing action of the biasing spring member 74 and the armature 70 is returned to its original position slightly away from the one surface of the rotor 58. At this original position, the elastic biasing action of the biasing spring member 74 is not exerted, and therefore, the armature 70 is held at this position. If desired, the end parts of the protruding portions 78 of the biasing spring member 74 can be modified slight to the right in FIGS. 2 and 3 thereby to press the armature 70 against the base parts of the protruding portions 78 by the elastic biasing action of the biasing spring member 74 even at this original position.

A cylindrical first boss member 82 is further mounted on the rotating shaft 32 at that position which is inwardly of (in FIGS. 2 and 3, to the right of) the armature assembly 60, and inwardly of (in FIGS. 2 and 3, to the right of) the first boss member 82, a gear 84 (constituting a second rotating element) constituting an output rotating element in the following description is mounted on the rotating shaft 32. The first boss member 82 is mounted for rotation as a unit with the rotating shaft 32 by forcing a pin 90 into a through-hole 88 formed in the rotating shaft 32 through a cut 86 formed at one end of the boss member 82. The first boss member 82 may be formed as an integral unit with the rotating shaft 32, or if required, as an integral unit with the sprocket 42 constituting the input rotating element. The gear 84 which constitutes the output rotating element is rotatably mounted on the rotating shaft 32. A boss portion 92 is formed integrally on one surface of the gear 84, and a cylindrical second boss member 94 is mounted on the inside diameter part of the boss portion 92. The second boss member 94 is mounted for rotation as a unit with the gear 84 by inserting a protruding portion 98 formed at its end surface into a through-hole 96 formed on the side surface of the gear 84. The second boss member 94 has substantially the same diameter as the diameter of the first boss portion 82, and is disposed adjacent to the first boss member 82 and extends toward the first boss member 82 from one surface of the gear 84. The second boss member 94 may also be formed as an integral unit with the gear 84 constituting the output rotating element. A coil spring means 100 is put over, and spans, the first and second boss members 82 and 94. The coil spring means 100 is wound in a right-handed turn as viewed from the left in FIG. 3 (therefore, in a direction in which it contracts when the armature assembly 60 is rotated incident to the rotation of the sprocket 42). One end 100a of the coil spring means 100 is connected to the supporting member 72 of the armature assembly 60 by being inserted in a cut 102 formed in one end of the supporting member 72, and its other end 100b is connected to the gear 84 by being inserted in any one of a plurality of (four in the illustrated embodiment) cuts formed in one end of the boss portion 92 of the gear 84.

Now, mainly with reference to FIG. 2, the operation and advantage of the electromagnetically controlled spring clutch mechanism 30 having the aforesaid structure will be described. First, let us assume that an electric current is supplied to the electromagnetic coil 50 and the solenoid 54 is energized. Upon energization of the solenoid 54, the armature 70 moves to the left in FIG. 2 against the elastic biasing action of the biasing spring member 74 and is magnetically attracted to one surface of the rotor 58. Thus, the armature 70 is connected to the rotor 58, and sets in operation. As a result, the rotating force of the sprocket 42 rotating in the direction shown by an arrow is transmitted to the armature 70 via the rotating shaft 32 and the rotor 58, and the armature assembly 60 rotates as a unit with the rotating shaft 32. When the armature assembly 60 is so rotated, the rotation of the supporting member 72 of the armature assembly 60 causes the coil spring means 100 to contract, and the first boss portion 82 is connected to the second boss port-on 94 via the coil spring means 100. Consequently, the rotating force of the sprocket 42 is transmitted to the gear 84 via the rotating shaft 32, the first boss member 82, the coil spring means 100 and the second boss member 94, and the gear 84 is rotated in a predetermined direction shown by an arrow 103 (FIG. 3).

On the other hand, when the supply of the current to the electromagnetic coil 50 is stopped to deenergize the solenoid 54, the armature 70 moves to the right in FIG. 2 by the elastic biasing action of the biasing spring member 74 whereby the above connection between the armature 70 and the rotor 58 is cancelled and the armature 70 returns to its original position (the armature 70 sets out of operation). Since the armature 70 itself is free and undergoes no resistance, the armature 70 rapidly returns to its non-operating position from its operating position. Furthermore, since the armature 70 is moved in a direction away from the rotor 58 by the elastic biasing action of the biasing spring member 74 disposed between the supporting member 72 and the armature 70, the connection between the armature 70 and the rotor 58 is cancelled rapidly. When the connection between the armature 70 and the rotor 58 is cancelled, the armature assembly 60 is rotated to some extent in a direction opposite to the rotating direction of the rotating shaft 32 shown by an arrow by the elastic force of the coil spring means 100 accumulated during the rotation of the armature assembly 60, and the coil spring means 100 is thus expanded. Since the armature assembly 60 is rotatably mounted on the rotating shaft 32, it is rotated easily and rapidly in the opposite direction during the expansion of the coil spring means 100 without undergoing strong resistance. Upon expansion of the coil spring means 100, the connection between the first boss member 82 and the second boss portion 94 by the coil spring means 100 is cancelled, and consequently the connection between the sprocket 42 and the gear 84 is cancelled. The gear 84 is thus kept from being rotated by the sprocket 42. When the solenoid 54 is in the deenergized state, the rotating shaft 32 is rotated in the predetermined direction shown by an arrow with respect to the gear 84, the second boss member 94, and the armature assembly 60 connected to the gear 84 via the coil spring means 100.

While one embodiment of the electromagnetically controlled spring clutch mechanism 30 constructed in accordance with this invention has been described with reference to FIGS. 2 and 3, this clutch mechanism 30 may alternatively use the gear 84 as the input rotating element by drivingly connecting it to the driving source through a suitable power transmission means, and the sprocket 42 as the output rotating element. In this embodiment, the gear 84 is rotated by the driving source in an opposite direction (the direction shown by an arrow 105 in FIG. 3) to the predetermined direction shown by an arrow 103 (FIG. 3) in which the gear 84 is rotated when the sprocket 42 is used as the input rotating element (and therefore when the gear 84 is used as the output rotating element).

The operation and advantage of the electromagnetically controlled spring clutch mechanism 30 in which the gear 84 is used as the input rotating element and the sprocket 42 as the output rotating element will be briefly described below with reference mainly to FIG. 2. When the solenoid 54 is energized in this alternative embodiment, the armature 70 is electromagnetically attracted to the rotor 58 against the elastic biasing action of the biasing spring member 74 and thus connected to the rotor 58 (the armature sets in operation). As a result, the coil spring means 100 contracts by the rotation of the gear 84 in the direction of arrow 105 (FIG. 3) by a driving source (not shown), and the second boss member 94 is connected to the first boss member 82 via the coil spring means 100. As a result, the rotating force of the gear 84 is transmitted to the sprocket 42 via the second boss member 94, the coil spring means 100, the first boss member 82 and the rotating shaft 32. Consequently, the sprocket 42 is rotated in a direction opposite to the direction shown by an arrow.

On the other hand, when the solenoid 54 is deenergized in the alternative embodiment, the above connection between the armature 70 and the rotor 58 is cancelled by the elastic biasing action of the biasing spring member 74, and the armature 70 is returned to its original position (the armature 70 sets out of operation). Upon cancellation of the above connection, the coil spring means 100 is expanded to cancel the connection between the second boss member 94 and the first boss member 82 by the coil spring means 100 and consequently the connection between the gear 84 and the sprocket 42. When the solenoid 54 is in the deenergized state, the gear 84, the second boss member 94 and the armature 60 connected to the gear via the coil spring means 100 are rotated in the direction shown by an arrow 104 (FIG. 3) with respect to the rotating shaft 32.

By using two electromagnetically controlled spring clutch mechanisms having nearly the same structure as the electromagnetically controlled spring clutch mechanism described hereinabove, there can be provided a composite electromagnetically controlled clutch assembly for selectively connecting drivingly an input rotating element adapted to be rotated in a predetermined direction to an output rotating element to rotate the output rotating element selectively in said predetermined direction or in a direction opposite to it.

Figure 4:
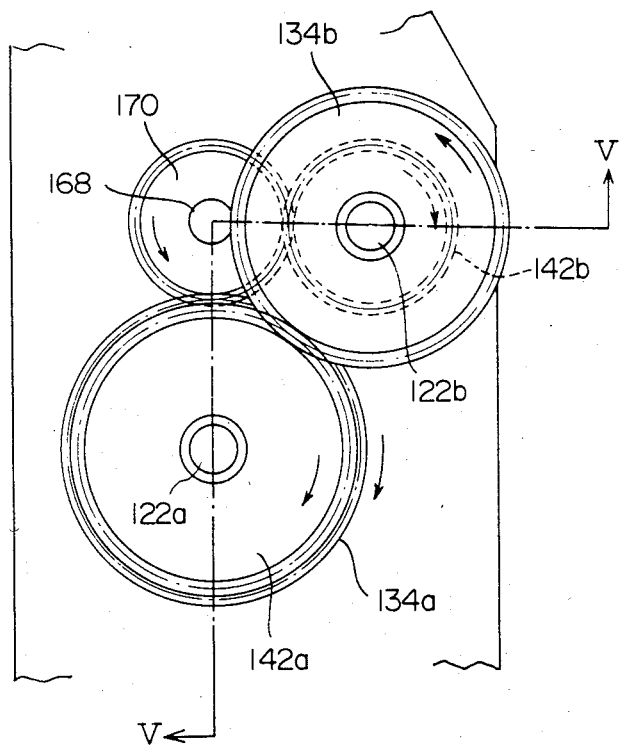
FIG. 4 is a view showing the state of connection in the composite electromagnetically controlled spring clutch assembly constructed in accordance with this invention.
Figure 5:
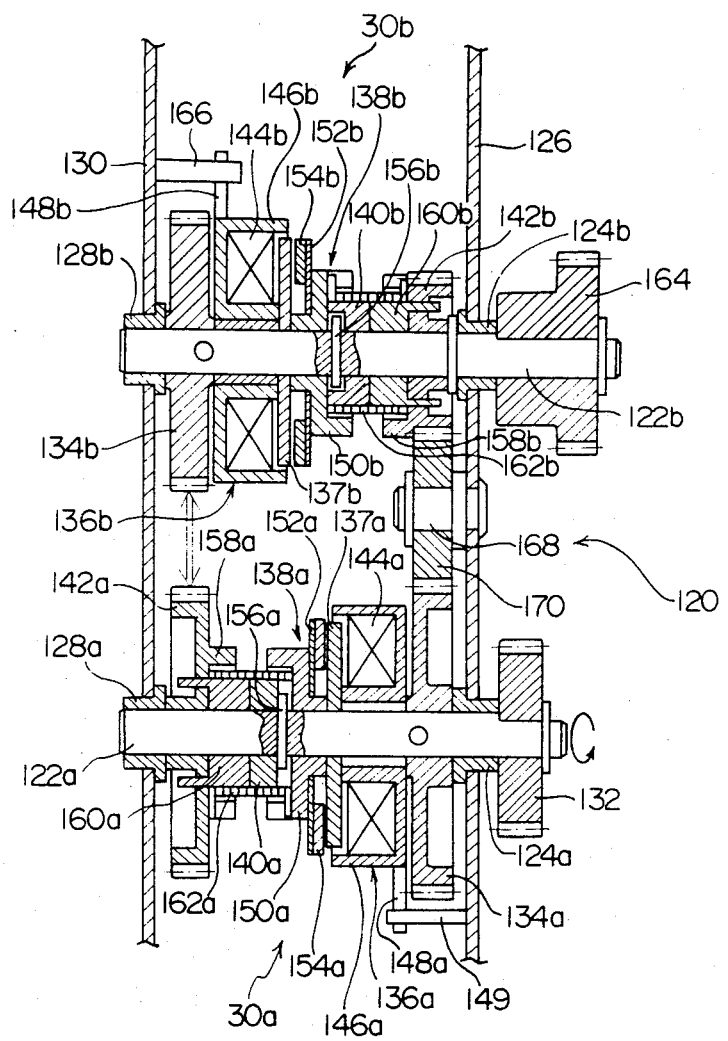
FIG. 5 is a sectional view taken on line V—V of FIG. 4.

The novel composite electromagnetically controlled spring clutch assemlby constructed in accordance with this invention will be described with reference to FIG. 4 showing the state of connection in the spring clutch mechanism and FIG. 5 showing a sectional view taken along line V—V of FIG. 4.

The composite electromagnetically controlled spring clutch assembly shown generally at 120 in FIG. 5 is composed of a first electromagnetically controlled spring clutch mechanism 30a and a second electromagnetically controlled spring clutch mechanism 30b having nearly the same structure as the spring clutch mechanism 30 described hereinabove.

The first spring clutch mechanism 30a includes a rotating shaft 122a. One end portion (the right end portion in FIG. 5) of the rotating shaft 122a is mounted rotatably on a supporting plate 126 through a bearing member 124a, and its other end (the left end in FIG. 5) is mounted rotatably on a supporting plate 130 through a bearing member 128a. One end of the rotating shaft 122a projects outwardly (to the right in FIG. 5) via the supporting plate 126, and to this projecting end portion an input gear 132 constituting an input rotating element is mounted for rotation with the rotating shaft 122a. The input gear 132 is connected to a driving source such as an electric motor through a suitable power transmission means (not shown), and rotated in the predetermined direction shown by an arrow.

A first gear 134a constituting a first power transmission element, a solenoid 136a constituting an electromagnetic means, a rotor 137a, an armature assembly 138a a first boss member 140a, and a second gear 142a constituting a second power transmission element are mounted on the rotating shaft 122a in this order from right to left in FIG. 5 between the mounting position of the bearing member 124a and the mounting position of the bearing member 128a. The first gear 134a is fixed to the rotating shaft 122a by such a member as a lock pin. The solenoid 136a having an electromagnetic coil 144a and a field core 146a is rotatably mounted on the rotating shaft 122a. A cut 148a is formed in a part of the solenoid 136a, and a pin 149 implanted in the supporting plate 126 is inserted in the cut 148a. Hence, the rotation of the solenoid 136a is hampered by the pin 149, and the rotating shaft 122a is rotated with respect to the solenoid 136a. The rotor 137a is mounted by forcing it into the rotating shaft 122a in the illustrated embodiment so that it rotates as a unit with the rotating shaft 122a. The armature assembly 138a includes a supporting member 150a to be mounted on the rotating shaft 122a, an armatur member 154a and a biasing spring member 152a disposed between the supporting member 150a and the armature member 154a. The armature assembly 138a is rotatably mounted on the rotating shaft 122a so that the armatur member 154a faces one side surface (the left surface in FIG. 5) of the rotor 137a. The biasing spring member 152a acts to bias the armature member 154a elastically to the left in FIG. 5 (therefore in a direction away from the rotor 137a). The first boss member 140a is mounted for rotation as a unit with the rotating shaft 122a by forcing a pin 156a in a throughhole formed in the rotating shaft 122a through a cut formed at one end of the boss member 140a. A boss portion 158a is formed on one surface of the second gear 142a, and the second boss member 160a is mounted on the inside diameter portion of the boss member 158a so that it rotates as a unit with the second gear 142a. The gear 142a is rotatably mounted on the rotating shaft 122a, and the second boss member 160a extends toward the first boss member 140a from one surface of the gear 142a. A coil spring means 162a is put over, and spans, the first boss member 140a and the second boss member 160a. The coil spring means 162a is wound in a right-handed turn as viewed from the right in FIG. 5 (and therefore, in a direction in which it contracts when the armature assembly 138a is rotated incident to the rotation of the input gear 132 shown by an arrow). One end of the coil spring means 162a is connected to the supporting member 150a of the armature assembly 138a by being inserted in a cut formed in the support member 150a, and its other end is connected to the boss portion 158a of the second gear 142a by being inserted in a cut formed in the boss portion 158a. The first electromagnetically controlled spring clutch mechanism 30a described above is substantially the same in structure as the spring clutch mechanism 30 shown in FIGS. 2 and 3 except the input gear 132 and the first gear 134a, and for details of its structure, reference may be made to the foregoing description of the spring clutch mechanism 30.

The second electromagnetically controlled spring clutch mechanism 30b includes a rotating shaft 122b. One end portion (the right end portion) of this rotating shaft 122b is rotatably mounted on the supporting plate 126 through a bearing member 124b, and its other end (the left end in FIG. 5) is rotatably mounted on the supporting plate 130 through a bearing member 128b. One end of the rotating shaft 122b projects outwardly (to the right in FIG. 5) through the supporting plate 126, and to the projecting end portion, an output gear 164 constituting an output rotating element is mounted for rotation as a unit with the rotating shaft 122b. A first gear 134b constituting a first power transmission mechanism, a solenoid 136b constituting an electromagnetic means, a rotor 137b, an armature assembly 138b, a first boss member 140b and a second gear 142b constituting a second power transmission element are mounted on the rotating shaft 122b in this sequence from left to right in FIG. 5 between the mounting position of the bearing member 128b and the mounting position of the bearing member 124b. The first gear 134b is fixed to the rotating shaft 122 by such a member as a lock pin. The first gear 134b is in mesh with the second gear 142a of the first spring clutch mechanism 30a (see FIG. 4 also), and is therefore rotated in a direction opposite to the rotating direction of the second gear 142a. The solenoid 136b having an electromagnetic coil 144b and a field core 146b is rotatably mounted on the rotating shaft 122b. A cut 148b is formed in a part of the solenoid 136b, and a pin 166 implanted in the supporting plate 130 is inserted in the cut 148b. Hence, the rotation of the solenoid 146b is hampered by the pin 166, and the rotating shaft 122b is rotated with respect to the solenoid 136b. The rotor 137b is mounted by forcing it into the rotating shaft 122b in the illustrated embodiment so that it rotates as a unit with the rotating shaft 122b. The armature assembly 138b includes a supporting member 150b adapted to be mounted on the rotating shaft 122b, an armature member 154b and a biasing spring member 152b disposed between the supporting member 150b and the armature member 154b. The armature assembly 138b is rotatably mounted on the rotating shaft 122b so that its armature member 154b faces one side surface (the right surface in FIG. 5) of the rotor 137b. The biasing spring member 152b acts so as to biasing the armature member 154b elastically to the right in FIG. 5 (therefore, in a direction away from the rotor 137b). The first boss member 140b is mounted for rotation as a unit with the rotating shaft 122b by forcing a pin 156b into a through-hole formed in the rotating shaft 122b through a cut formed in one end of the first boss member 140b. A boss portion 158b is formed on one surface of the second gear 142b, and the second boss member 160b is mounted on the inside diameter part of the boss portion 158b so that it rotates as a unit with the second gear 142b. The gear 142b is rotatably mounted on the rotating shaft 122b, and the second boss member 160b extends toward the first boss member 140b from one surface of the gear 142b. The second gear 142b is drivingly connected to the first gear 134a of the first spring clutch mechanism 30a through an intermediate gear 170 mounted rotatably on a supporting shaft 168 implanted in the inner surface of the supporting plate 126 (see FIG. 4 also). Accordingly, the second gear 142b is rotated in the same direction as the rotating direction of the first gear 134a. A coil spring means 162b is put over, and spans, the first boss member 140b and the second boss member 160b. The coil spring means 162b is wound in a right-handed turn as viewed from left in FIG. 5 (therefore, in a direction in which it contracts when the armature assembly 138b is rotated through the second gear 142a of the first spring clutch mechanism 30a and the first gear 134b of the second spring clutch mechanism 30b incident to the rotation of the input gear 132 as shown by an arrow). One end of the coil spring means 162b is connected to the supporting member 150b of the armature assembly 138b by being inserted in a cut formed in the supporting member 150b, and its other end is connected to the boss portion 158b of the second gear 142b by being inserted in a cut formed in the boss portion 158b. The second electromagnetically controlled spring clutch mechanism 30b described above is substantially the same in structure as the spring clutch mechanism 30 shown in FIGS. 2 and 3 except the output gear 164 and the first gear 134b. For details of this structure, reference may be made to the foregoing description of the spring clutch mechanism 30.

Now, the operation and advantage of the composite electromagnetically controlled spring clutch assembly 120 described above and including the first and second electromagnetically controlled spring clutch mechanisms 30a and 30b will be described mainly with reference to FIG. 5.

First, let us assume that the solenoid 136a of the first spring clutch mechanism 30a and the solenoid 136b of the second spring clutch mechanism 30b are in the deenergized state. When the solenoids 136a and 136b are in the deenergized state, the armature 154a is held at a non-operating position by the elastic biasing action of the biasing spring member 152a and the connection between the first boss member 140a and the second boss member 160a by the coil spring means 162 is cancelled in the first spring clutch mechanism 30a. In the second spring clutch mechanism 30b, the armature member 154b is held at its non-operating position by the elastic biasing spring member 152b, and the connection between the second boss member 160b and the first boss member 140b by the coil spring means 162 is cancelled. Accordingly, the rotating force of the input gear 132 rotated in the direction of an arrow is transmitted to the rotating shaft 122a of the first spring clutch mechanism 30a, and from there to the second gear 142b of the second spring clutch mechanism 30b through the first gear 134a and the intermediate gear 170. The output gear 164, however, is not rotated since the armature assembly 138a and the second gear 142a are rotatably mounted on the rotating shaft 122a in the first spring clutch mechanism 30a and the armature assembly 138b and the second gear 142b are rotatably mounted on the rotating shaft 122b in the second spring clutch mechanism 30b. It will be easily understood from the foregoing description that at this time, the rotating shaft 122a rotates as a unit with the input gear 132 rotating in the direction shown by an arrow to rotate the first gear 134a of the first spring clutch mechanism 30a in the direction of an arrow (FIG. 4), the intermediate gear 170 in the direction shown by an arrow (FIG. 4), and the second gear 142b of the second spring clutch mechanism 30b in the direction shown by an arrow in a broken line (FIG. 4), and the armature assembly 138b rotates as a unit with the second gear 142b.

When in the foregoing state the solenoid 136a of the first spring clutch mechanism 30a is energized, the armature member 154a moves to the right in FIG. 5 against the elastic biasing action of the biasing spring member 152a in the first spring clutch mechanism 30a and is magnetically attracted to one surface of the rotor 137a and thus connected to it (whereupon the first spring clutch mechanism 30a is in connection). As a result, the rotating force of the input gear 132 rotating in the direction of an arrow is transmitted to the armature assembly 138a via the rotating shaft 122a and the rotor 137a, and the armature assembly 138a rotates as a unit with the rotating shaft 122a. When the armature assembly 138a is thus rotated, the coil spring means 162a is contracted by the rotation of the supporting member 150a of the armature assembly 138a, and the first boss member 140a and the second boss member 160a are connected through the coil spring means 162a. The rotating force of the input rotating gear 132 is transmitted to the second gear 142a through the rotating shaft 122a, the first boss member 140a and the second boss member 160a, and the second gear 142a is rotated in the direction shown by an arrow (FIG. 4). When the second gear 142a is so rotated, the first gear 134b of the second spring clutch mechanism 30b is rotated in a direction shown by an arrow (FIG. 4), and the output gear 164 is rotated through the first gear 134b and the rotating shaft 122b. Consequently, the input gear 132 and the output gear 164 are drivingly connected through the second gear 142a of the first spring clutch mechanism 30a and the first gear 134b of the second spring clutch mechanism 30b, and the output gear 164 is rotated in a direction opposite to the predetermined rotating direction of the input gear 132 shown by an arrow.

In this case, the rotating force of the input gear 132 is transmitted to the second gear 142b of the second spring clutch mechanism 30b via the first gear 134a of the first spring clutch mechanism 30a and the intermediate gear 170. But since the armature member 154b of the second spring clutch mechanism 30b is in the nonoperative state, the rotating force of the second gear 142b is not transmitted to the rotating shaft 122b Accordingly, the second gear 142b and the armature assembly 138b connected to it through the coil spring means 162b are rotated with respect to the rotating shaft 122b in a direction opposite to the rotating direction of the rotating shaft 122b.

On the other hand, when the solenoid 136b of the second spring clutch mechanism 30b is energized in the composite spring clutch mechanism, the armature member 154b moves to the left in FIG. 5 against the elastic biasing action of the biasing spring member 152b in the second spring clutch mechanism 30b and is magnetically attracted to one surface of the rotor 137b and thus connected to the rotor 137b (the second spring clutch mechanism 30b is in connection). As a result, the coil spring means 162b is contracted by the rotating force of the second gear 142b rotated through the first gear 134a of the first spring clutch mechanism 30a and the intermediate gear 170. The second boss member 160b and the first boss member 140b are connected through the coil spring means 162b. Upon connection, the rotating force of the input gear 132 is transmitted from the second gear 142b to the output gear 164 via the second boss member 160b, the first boss member 140b and the rotating shaft 122b, and the output gear 164 is rotated. Thus, the input gear 132 and the output gear 164 are drivingly connected via the first gear 134a of the first spring clutch mechanism 30a, the intermediate gear 170 and the second gear 142b of the second spring clutch mechanism 30b, and the output gear 164 is rotated in the same direction as the predetermined rotating direction of the input gear 132 shown by an arrow.

In this case, the rotating force of the rotating shaft 122b in the second spring clutch mechanism 30b is further transmitted to the second gear 142a of the first spring clutch mechanism 30a through the first gear 134b. Since, however, the armature member 154a of the first spring clutch mechanism 30a is in the non-operative state, the rotating force of the second gear 142a is not transmitted to the rotating shaft 122a. Accordingly, the second gear 142a and the armature assembly 138a connected to it through the coil spring means 162a is rotated with respect to the rotating shaft 122a in a direction opposite to the rotating direction of the rotating shaft 122a rotated as a unit with the input gear 132.

As can be seen from the foregoing description, by properly prescribing the number of teeth in the second gear 142a of the first spring clutch mechanism 30a and the first gear 134b of the second spring clutch mechanism 30b, the speed of rotation of the output gear 164 can be set at a desired value with respect to the rotating speed of the input gear 132 which rotates in a direction opposite to the rotating direction of the output gear 164. Furthermore, by properly prescribing the number of teeth in the first gear 134a of the first spring clutch mechanism 30a and the second gear 142b of the second spring clutch mechanism 30b, the rotating speed of the output gear 164 can be prescribed at a desired value with respect to the rotating speed of the input gear 132 which rotates in a direction opposite to the rotating direction of the output gear 164.

The composite electromagnetically controlled spring clutch mechanism 120 in accordance with this invention has been described with reference to FIGS. 4 and 5. The operation and advantage of each of the first and second spring clutch mechanisms in detail are substantially the same as those of the electromagnetically controlled spring clutch mechanism 30 shown in FIGS. 2 and 3, and reference may be made to them.

The composite electromagnetically controlled spring clutch mechanism having the structure described above can, for example, be used especially preferably in a reciprocation switching clutch means for reciprocating a document placing stand (or a part of an optical device) in an electrostatic copying apparatus during exposure and scanning.

While the electromagnetically controlled spring clutch mechanism constructed in accordance with this invention and the composite electromagnetically controlled spring clutch mechanism utilizing the electromagnetically controlled spring clutch mechanism have been described hereinabove with reference to the specific embodiment shown in the drawings, it should be understood that the present invention is not limited to these specific embodiments, and various changes or modifications are possible without departing from the scope of the invention.

What is claimed is:

1. An electromagnetically controlled spring clutch mechanism for selectively connecting drivingly a first rotating element and a second rotating element one of which constitutes an input rotating element to be rotated in a predetermined direction and the other of which constitutes an output rotating element, said mechanism comprising:
   a rotating shaft to which the first rotating element is fixed and on which the second rotating element is mounted rotatably,
   a rotor adapted to be rotated as a unit with the rotating shaft,
   an armature assembly disposed on one side of the rotor and including an armature member positioned opposite to one surface of the rotor, a supporting member mounted rotatably on the rotating shaft and a biasing spring member disposed between the supporting member and the armature member for elastically biasing the armature member in a direction away from said one surface of the rotor,
   an electromagnetic means adapted when energized to attract magnetically the armature member to said one surface of the rotor against the elastic biasing action of the biasing spring member,
   a first boss member adapted to rotate as a unit with the rotating shaft,
   a second boss member disposed adjacent to the first boss member and adapted to rotate as a unit with the second rotating element, and
   a coil spring means received about, and spanning, the first and second boss members and connected to the armature assembly at one end and to the second rotating element at the other end, said coil spring means being wound from said one end to said other end in a direction in which said coil spring means contracts when the armature assembly and the second rotating element are rotated relative to each other incident to the rotation of said input rotating element in said predetermined direction.

2. The mechanism of claim 1 wherein the electromagnetic means is disposed on the other side of the rotor.

3. The mechanism of claim 1 wherein the rotor is composed of an annular plate fixed to the rotating shaft, and the armature assembly is composed of an annular plate having nearly the same outside diameter as the outside diameter of the rotor.

4. The mechanism of claim 1 wherein the biasing spring member in the armature assembly has an annular central portion and a plurality of protruding portions having free ends and extending in the form of a sickle blade from the central portion, the central portion is fixed to the supporting member, and the free ends of the protruding portions are fixed to the armature member.

5. A composite electromagnetically controlled spring clutch assembly for selectively connecting drivingly an input rotating element adapted to be rotated in a predetermined direction to an output rotating element to rotate the output rotating element selectively in said predetermined direction or in a direction opposite to said predetermined direction, said clutch assembly being composed of a first electromagnetically controlled spring clutch mechanism and a second electromagnetically controlled clutch mechanism, said first electromagnetically controlled clutch mechanism comprising (a) a rotating shaft having said input rotating element fixed thereto, (b) a first power transmission element fixed to the rotating shaft, (c) a second power transmission element rotatably mounted on the rotating shaft, (d) a rotor adapted to rotate as a unit with the rotating shaft, (e) an armature assembly disposed on one side of the rotor and including an armature member positioned opposite to one surface of the rotor, a supporting member mounted rotatably on the rotating shaft, and a biasing spring member disposed between the supporting member and the armature member for elastically biasing the armature member in a direction away from said one surface of the rotor, (f) an electromagnetic means adapted when energized to attract magnetically the armature member to said one surface of the rotor against the elastic biasing action of the biasing spring member, (g) a first boss member adapted to rotate as a unit with the rotating shaft, (h) a second boss member disposed adjacent to the first boss member and adapted to rotate as a unit with the second power transmission member, and (i) a coil spring means received about, and spanning, the first and second boss members and connected to the armature assembly at one end and to the second power transmission element at the other end, said coil spring means being wound from said one end to said other end in a direction in which said coil spring means contracts when the armature assembly and the second power transmission element are rotated relative to each other incident to the rotation of the input rotating element in said predetermined direction, and the second electromagnetically controlled spring clutch mechanism comprising (a) a rotating shaft having the output rotating element fixed thereto, (b) a first power transmission element fixed to the rotating shaft, (c) a second power transmission element mounted rotatably on the rotating shaft, (d) a rotor adapted to rotate as a unit with the rotating shaft, (e) an armature assembly disposed on one side of the rotor and including an armature member positioned opposite to one surface of the rotor, a supporting member mounted rotatably on the rotating shaft and a biasing spring member disposed between the supporting member and the armature member for elastically biasing the armature member in a direction away from said one surface of the rotor, (f) an electromagnetic means adapted when energized to attract magnetically the armature member to said one surface of the rotor against the elastic biasing action of the biasing spring member, (g) a first boss member adapted to rotate as a unit with the rotating shaft, (h) a second boss member disposed adjacent to the first boss member and adapted to rotate as a unit with the second power transmission element and (i) a coil spring means received about, and spanning, the first and second boss members and connected to the armature assembly at one end and to the second power transmission element at the other end, said coil spring means being wound in a direction in which said coil spring means contracts when the armature assembly and the second power transmission element are rotated relative to each other by the rotation of the second power transmission element which is incident to the rotation of the input rotating element in said predetermined direction, a set of the first power transmission element of the first electromagnetically controlled spring clutch mechanism and the second power transmission element of the second electromagnetically controlled spring clutch mechanism and a set of the second power transmission element of the first electromagnetically controlled spring clutch mechanism and the first power transmission element of the second electromagnetically controlled spring clutch mechanism being drivingly connected so that the power transmission elements in one of said sets rotate in the same direction and the power transmission elements in the other set rotate in opposite directions to each other.

6. The composite assembly of claim 5 wherein the electromagnetic means in each of the first and second spring clutch mechanisms is disposed on the other side of the rotor.

7. The composite assembly of claim 5 wherein in the first and second spring clutch mechanisms, the rotor is composed of an annular plate fixed to the rotating shaft, and the armature member is composed of an annular plate having nearly the same outside diameter as the outside diameter of the rotor.

8. The composite assembly of claim 5 wherein in the first and second spring clutch mechanisms, the biasing spring member in the armature assembly has an annular central portion and a plurality of protruding portions having free ends and extending in the form of a sickle blade from the central portion, the central portion is fixed to the supporting member, and the free ends of the protruding portions are fixed to the armature member.

* * * * *